July 15, 1924.
A. D. MEISELBACH
1,501,129
METHOD AND MEANS FOR BUILDING TUBULAR FRAMES
Filed July 31, 1922  3 Sheets-Sheet 2
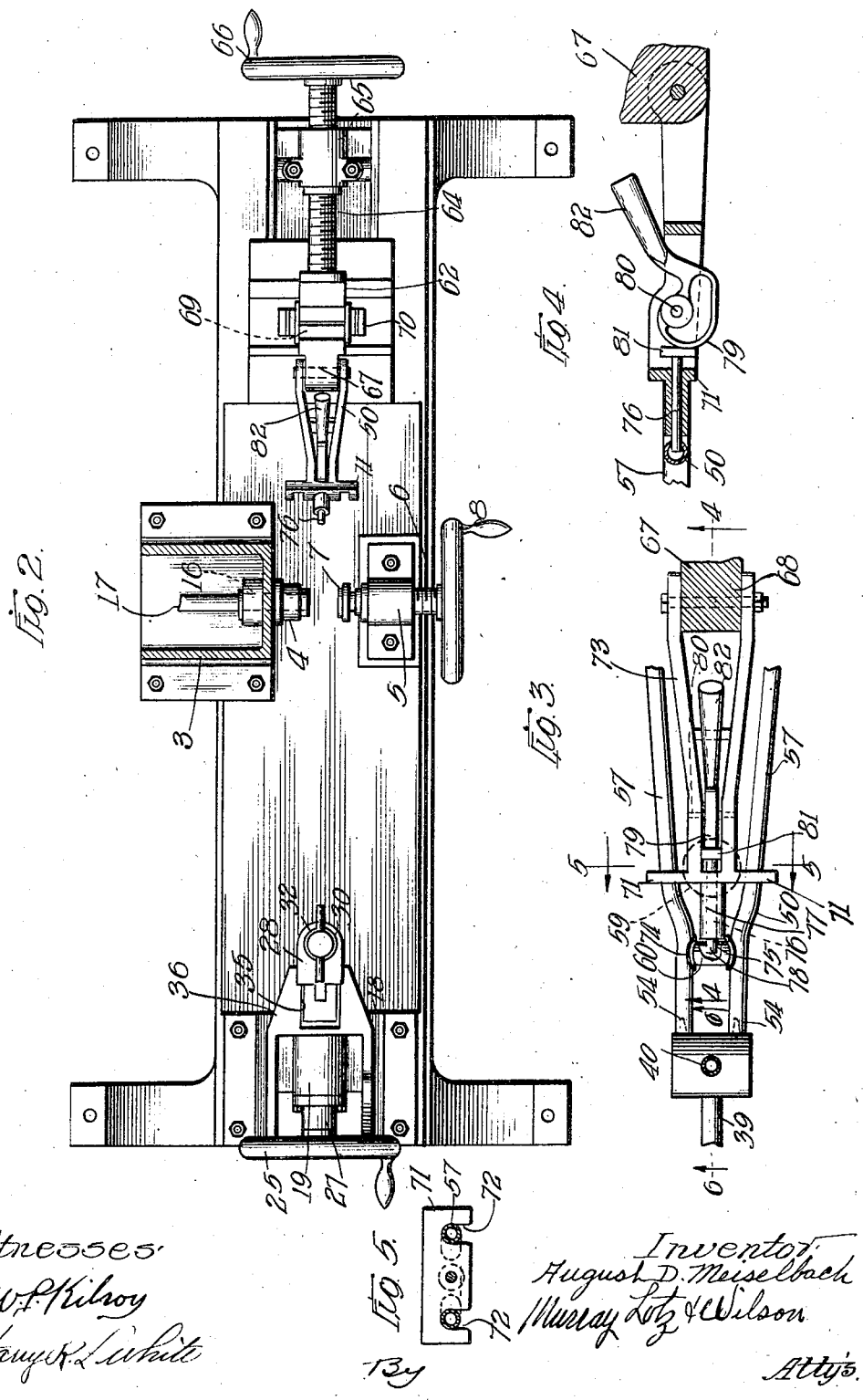

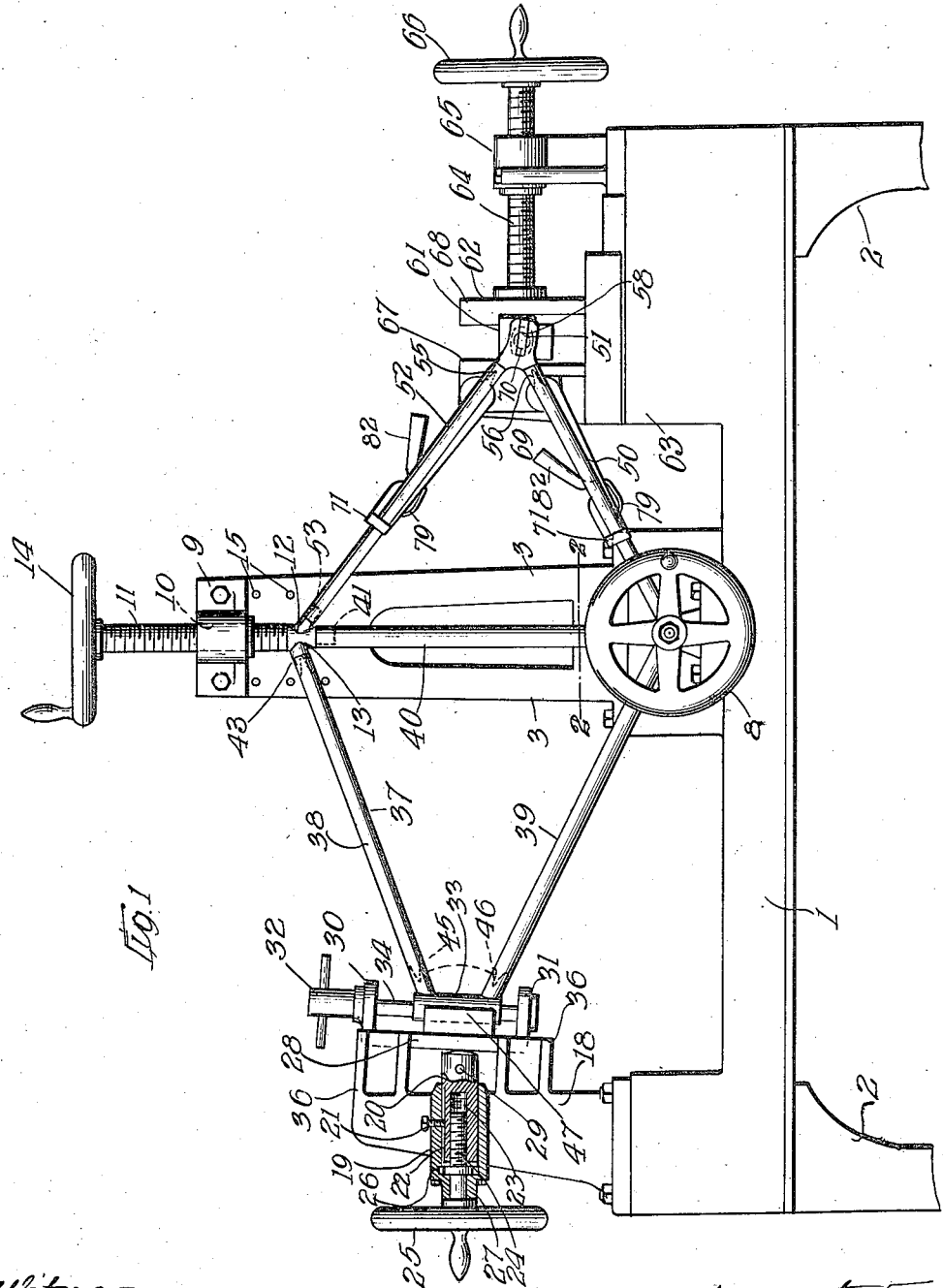

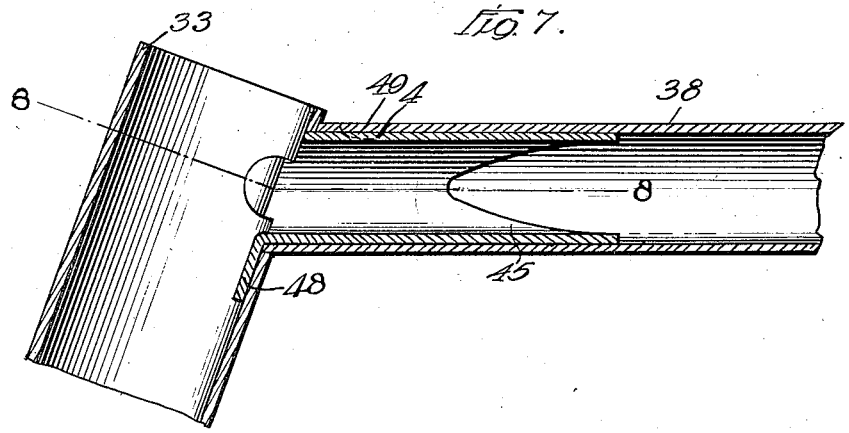
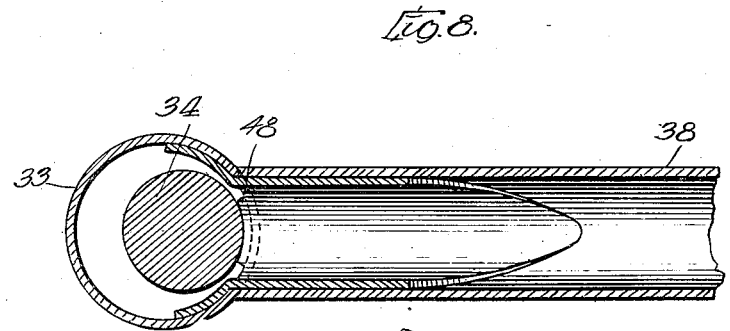
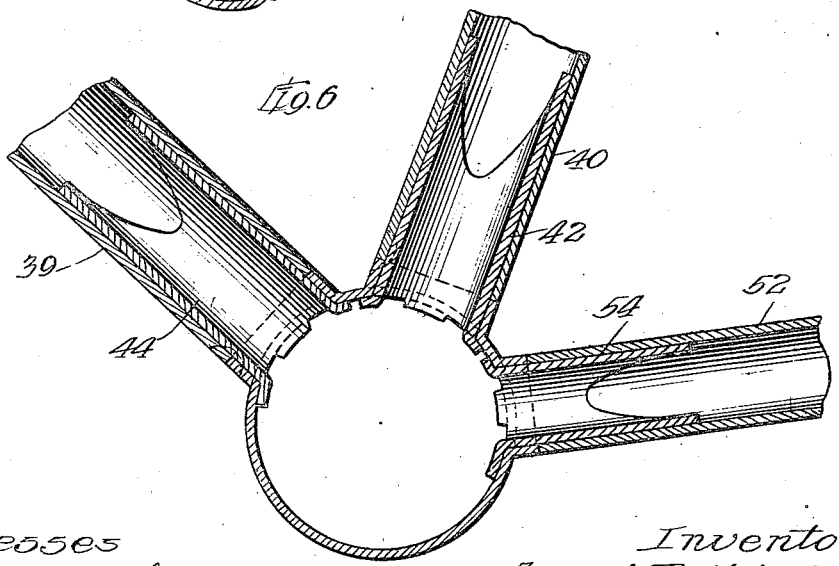

Patented July 15, 1924.

1,501,129

UNITED STATES PATENT OFFICE.

AUGUST D. MEISELBACH, OF SHELBY, OHIO, ASSIGNOR TO MARGARET MEISELBACH, OF SHELBY, OHIO.

METHOD AND MEANS FOR BUILDING TUBULAR FRAMES.

Application filed July 31, 1922. Serial No. 578,707.

*To all whom it may concern:*

Be it known that I, AUGUST D. MEISELBACH, a citizen of the United States, and resident of Shelby, in the county of Richland and State of Ohio, have invented certain new and useful Improvements in Methods and Means for Building Tubular Frames, of which the following is a specification.

My invention relates to improvements in methods and means for building or manufacturing tubular frames such as frames for bicycles and the like.

My present invention is a further development and improvement upon my invention disclosed in my application, Serial No. 376,561, filed April 26, 1920.

The frames particularly to which my invention relates are bicycle frames or frames which are symmetrical upon two sides of a central plane and consist of tubular bars which extend between and join the various parts and connections by which the frame is connected with other parts of the mechanism, in a bicycle these other parts being the front forks, the crank shaft, the rear wheel, saddle, handle part, etc.

In such frames the center line of the head connection should be in the same plane in which the center line of the middle or center post lies. The upper and lower bars of the front part of the frame should be accurately in the same plane with each other and the rear parts of the frame should lie symmetrically upon the two sides of the longitudinal center plane of the frame, and the slotted plates for the rear wheel or axle should be accurately parallel to each other and at equal distances from the central plane.

In practicing my invention, I provide a substantial and rigid machine having certain fixed parts and certain adjustable parts by means of which I am enabled to set a bicycle frame, in the process of manufacture, with all of its parts accurately in the relative positions they should occupy when the bicycle frame is completed.

I preferably first loosely assemble all of the parts of a bicycle frame placing the elongated tubular members upon suitable thimbles and dowels held on or formed with the various connections and this having been done my machine is arranged to tightly clamp one connection of the frame, preferably the crank box in position. Having done this, I preferably force the seat post connection toward the crank box thus placing the center vertical tubular member and its end joints under compression. Thereafter I force the head connection toward the crank box and also toward the seat post connection thus placing both the upper and lower parts of the front part of the frame and their end joints under compression, the machine being formed to automatically equalize the pressure on these two bars. Furthermore, the machine is so constructed that the rear slotted connections can be forced toward the crank box and toward the seat post connection to place the upper and lower members of the rear part of the frame under equal compression.

I also provide in connection with the features mentioned, means for accurately placing the side bars of the upper and lower rear forks accurately transversely of the frame at points opposite to the positions to be occupied by the rim and tire of the rear wheel and in connection with this feature I arrange means for pressing tubular transverse braces between the side members of these forks in their proper relations and positions.

Having thus placed all of the tubular members with their connections at their outer ends under compression and pressed toward the crank box and the seat post connection, I proceed to make all of these connections rigid by spot welding the overlapping parts together so that when the pressure is relieved and the frame is removed from the machine all of the parts will occupy their true positions and the frame itself will be accurately symmetrical upon the two sides of the central vertical longitudinal plane.

The several joints are completed by first dipping them into a suitable flux and then immersing them in suitable brazing material, the superfluous brazing material being thereafter removed from the exposed surfaces of the connections by means of electricity so that by means of my improved method, substantially no expert laborious labor is required in making the connections of the frame and the result is that the frame when completed has an exposed exterior surface which is composed of the original surfaces of the several pieces of tubing which original surfaces were formed in the dies in which the tubing was produced. The exterior surface, being as described, is in the best condition for being readily finished by enameling and producing frames having the most perfect enameled surface as the originally produced accurate and smooth surfaces have not been disturbed.

By means of my improvements I am enabled to produce frames with very much less labor, with no necessity of adjusting the various parts of the frame after the joints have been brazed, which has heretofore been a large item of cost in the manufacture of bicycle frames and I am enabled to eliminate entirely the incipient checks or cracks which will of necessity be caused or produced in the surface of such tubing when it is necessary to strain or bend the tubing to bring the parts into alignment under the old method.

My invention will be more readily understood by reference to the accompanying drawings forming part of this specification and in which:

Figure 1 is a side elevation of my improved machine shown partly in section;

Figure 2 is a plan view of the machine with the center post shown in section on the line 2—2 of Figure 1;

Figure 3 is a fragmentary plan view particularly illustrating the means for setting the rear members of the frame transversely;

Figure 4 is a fragmentary vertical section on the line 4—4 of Figure 3;

Figure 5 is a transverse vertical section on the line 5—5 of Figure 3;

Figure 6 is a fragmentary vertical sectional view on the line 6—6 of Figure 3;

Figure 7 is a fragmentary vertical sectional view of the bicycle head; and

Figure 8 is a horizontal sectional view on the line 8—8 of Figure 7.

The machine consists of a suitable base or bed plate 1 mounted on legs 2 to place the bed at a working height. At the middle part of the base I provide a vertical standard 3 arranged at one side and carrying a horizontally projecting nozzle or mandrel 4 for receiving the crank box of a bicycle frame. At the opposite side of the base I provide a rigid bearing 5 in which is mounted a screw 6 in axial alignment with the mandrel 4, the inner end of the screw carrying a mandrel plug 7 adapted to be entered into the opposite end of the crank box of a bicycle frame and adapted to clamp same endwise rigidly between the head 7 and the inner end of the mandrel 4, the outer end of the screw 6 being provided with a hand wheel 8 by which the screw can be manipulated to clamp and unclamp the crank box.

At the upper end of the standard 3, I provide a bearing member 9 having a vertically threaded opening 10 to receive a vertical screw 11. This screw is provided with a central projection on its lower end adapted to enter a seat post bracket 13 of a bicycle frame and the lower end of the screw is adapted to be pressed tightly down upon the seat post bracket 13 as best shown in Figure 1.

The screw 11 carries a suitable hand wheel 14 fixed on its upper end for manipulating the screw and the bearing 9 is arranged to be placed at different heights above the crank box for use in building bicycle frames of different heights; this is indicated by the several screw holes 15 for receiving the bolts which secure the bearing 9 to the standard 3.

The screw 11 is set so that its axis when extended will cut the axis of the crank box. The mandrel 4 is provided with a central longitudinal hole 16 and I provide a pipe 17 secured in the outer end of this hole and through which I can supply air under pressure to blow into the crank box and through the hollow bicycle frame to cool the joints after they have been spot welded as hereinafter described.

At one end of the machine, I mount a fixed standard 18 provided with a horizontal bearing hub 19 in which I slidingly mount a shaft 20, the shaft being prevented from rotation in the hub by any suitable means such as a set screw 21, the point of which enters a longitudinal slot 22 in the surface of the shaft. The shaft 20 is provided with a central threaded opening 23 in which is mounted a screw 24, the outer end of the screw having a hand wheel 25 by which it may be rotated and I hold the screw against endwise movement by a collar 26 mounted between the outer end of the bearing 19, a fixed collar bearing and the hub of the hand wheel 25. The construction is such that when the hand wheel is rotated the shaft 20 is moved back and forth.

Upon the inner end of the shaft I pivotally mount a substantial vertical yoke 28 by means of a horizontal pin 29 and this yoke is provided with rearwardly extending ends 30 and 31 which are perforated to receive a clamping arbor 32. The ends 30 and 31 are spread apart to receive between them the tubular head 33 of a bicycle frame, and the clamping arbor 32 is provided with an eccentric middle portion 34 adapted to clamp the inner flanged heads of thimbles within the head 33 as will be described more fully hereinafter.

The yoke 28 is held in vertical position in slots 35 formed in forwardly extending rigid projections 36 on the standard 18 so that when the shaft 20 is moved back and forth the yoke is moved with it and serves to apply pressure upon a bicycle frame 37 arranged in the machine. The pivoting of the yoke is for the purpose of equalizing the pressure upon the upper bar 38 and the lower bar 39. The lower bar extends from the crank box to the head 33 and the upper bar extends from the seat post bracket 13 to the head 33. Between the crank box and the seat post bracket is arranged a vertical tubular member 40 of the bicycle frame.

In the operation of clamping the frame into the machine the crank box is first clamped in position between the arbors 4 and 7. Then the seat post bracket is forced down toward the crank box tightly clamping the vertical member 40 between these two parts, the seat post bracket having a dowel part 41 for entering the upper end of the tube 40 and the crank box having a suitable dowel 42 for entering the lower end of this member. The seat post bracket also has a doweling part 43 for centering the upper tubular member 38 and the crank box has a suitable doweling member 44 for centering the lower end of the lower tubular member 39. The head 33 carries doweling members 45 for the upper member 38 and 46 for the lower member 39.

The yoke 28 is provided with a half-bearing 47 for contact with the bicycle head 33 and when the yoke is forced rearwardly the head is forced bodily toward the rear and pressure is applied to both the upper and lower members 38 and 39 to tightly clamp them endwise, the upper member 38 between the head 33 and the seat post connection and the lower member 39 between the head 33 in the crank box. The yoke being pivoted the pressure is equalized upon these two members and they are both thus firmly clamped endwise in the bicycle frame, the joints between these members and the several connections being tightly closed even though either of the members 38 or 39 might not be of accurate length. For instance, if the lower member 39 were tightly clamped before the upper member 38 was similarly clamped the yoke 28 would swing on its pivot 29 upon further pressure being applied and tightly clamp the member 38. This is an important feature of my invention for the reason that in rapid manufacturing processes it is expensive to make the several parts accurate as to dimensions beyond a certain point and to accomplish the production of the close tight joints which is the ultimate object of my invention it is necessary to clamp the several members of the frame so that each and every joint comes to a solid bearing. The pivotal mounting of the yoke 28 results in this tight clamping of both the upper and lower members of the bicycle frame in the manner desired.

After having clamped the two members 38 and 39 between the several connections as described, I next proceed to tightly clamp the dowels 45 and 46. These dowels, as best shown in Figure 7, are preferably made of sheet metal and have parts 48 at their inner ends adapted to be bent over within the head 33 to form flanges and I desire to clamp these flanges 48 tightly against the inner surface of the tubular head 33 at the same time that the tube 38 is clamped against the outer surface of the head 33 and for this purpose I provide the eccentric shaft 34 hereinbefore spoken of extending through the head 33 and adapted upon being rotated to engage the flanges 48 and set them tightly against the inner surface of the head 33 as best shown in Figure 8. One step in my process of making such frames is to make the frame a rigid entity after it has been properly clamped into the machine and for this purpose I spot weld the ends of the various tubular members to their connecting parts or to the doweling members as shown at 49, Figure 7. The forward end of the upper tube 38 is shown spot welded to the doweling member 45. This doweling member having been tightly clamped against the inner surface of the head 33 and the tubular member 38 having been tightly clamped against the outer surface of the head 33 and these two members having been welded together, this is a rigid joint and the parts cannot change their relative positions without destroying the weld particularly in view of the fact that the top tube 38 extends at an inclination to the head 33.

The same operations are proceeded with in relation to the rear end of the upper member 38 and both ends of the member 39 thus making the part of the bicycle thus far described a rigid structure. It might be explained that the head 33 when held in the bearing 47 lies in the central plane of the machine, that the center line of the screw 11 lies in this plane and that consequently when the several connections and tubes are arranged as shown in Figure 1 all of their center lines lie in this central plane of the machine, that is, in the positions they should occupy in the finished frame.

The rear part of a bicycle frame consists of lower tubular members 50 extending from the crank box to rear slotted plates 51 and upper tubular members 52 extending from the seat post bracket 13 to said slotted plates 51, the seat post bracket having suitable dowels 53 for the members 52, the crank box having dowels 54 for the member 50 and the slotted plates 51 having upper dowels 55 and lower dowels 56 for these members.

The lower member 50 is in the form of a fork made up of two side parts 57 the forward end of each of these side parts being doweled to the crank box and the rear end of each doweled to one of the slotted plates 51. Likewise the upper member 52 is in the form of a similar fork. These two forks straddle the rear wheel of a bicycle, the wheel being mounted upon an axle, the ends of which are received in the slots 58 of the plates 51 and when a frame is accurately aligned the two slotted plates 51 are equidistant from the center plane of the frame and are accurately parallel with each other and the middle portions of the forks should be so formed and positioned that the tire of the rear wheel indicated by the dotted circle 59 Figure 3 should lie centrally between the forks. In other words the forks should be symmetrically arranged in relation to the central plane of the machine. It is desirable to brace the two side members of each fork between their ends and it is usual to arrange a tubular brace or strut 60 between the two sides of each fork as shown in Figure 3 just beyond the position to be occupied by the tire and it is part of my improvement to accurately place these struts and to accurately position the sides of the members 50 and 52.

For properly setting the slotted plates 51, I provide a block 61 mounted in a head 62 which in turn is mounted upon the rear part 63 of the base 1. The head is movable longitudinally on the base by means of a screw 64 mounted in a fixed bearing 65, the screw being provided with a suitable hand wheel 66. The block 61 is vertically movable between jaws 67 and 68 on the head 62 and in this block I mount a transverse member 69 having suitable projections 70 on its outer end to enter the slots 58 in the plates 51. This member 69 can rotate in the block and thus accommodate itself to the angularity of the slots 58.

In making a bicycle frame by means of my machine, I assemble the tubular parts of the rear forks with the other connections and parts of the frame and then proceed as hereinbefore described regarding the forward part of the machine. That is, I place the frame in the machine and set the various connections toward the crank box. In setting the frame in the machine I place the slotted plates on the ends of the member 69 with the ribs 70 in the slots. After the forward part of the frame has been properly set I force the slotted plates 51 forward by means of the screw 64 the vertically movable block 61 permitting adjustment of the plates 51 to produce an equalized pressure on the upper and lower rear forks. The screw 64 is operated until both the upper and lower forks are rigidly compressed between the connections at their ends. The next step is to accurately set the members of each of the rear forks transversely and for this purpose I provide for each fork a plate member 71 having slots 72 in one edge and of a size and spaced apart to receive and properly position the side members 57 of the fork. This plate is mounted on the end of a swinging lever 73 which is forked at its rear end to straddle the forward end of the jaw 67 and is pivotally mounted on said jaw by a horizontal bolt 67'. The member 73 swings up and down and when swung down the plate 71 straddles the two bars 57 and sets them accurately in position. I preferably arrange this plate 71 adjacent to the place to be occupied by the tire 59 so that the members 57 shall be accurately placed at these points.

The struts 60 are formed of tubes with small circumferential flanges 74 at their ends adapted to partially encircle the members 57 and the inner side of each strut is provided with a small hole 75. For setting these struts, I provide plungers 76 mounted centrally and longitudinally of the levers 73, these members being provided with guide nozzles 77 for the plungers 76. The outer ends of the plungers are relatively small providing shoulders 78 adapted to contact with the struts 60, the small ends of these plungers entering the holes 75 to retain the dowel on the plunger. This plunger is adapted to be forced outwardly by means of a cam member 79 mounted between the side bars of the member 77 on a pivot 80, the inner end of the plunger 76 having a suitable head 81 for contact with the surface of the cam and the cam provided with a suitable handle 82 for operating it. In operating this part of the machine, the member 73 is swung on its pivot to cause the slotted plate 71 to straddle the forks and then the handle 82 of the cam is pushed toward the rear to force the plunger 76 forwardly and push the strut 60 tightly between two sides of the fork. After this has been done for both the upper and the lower rear forks the several connections are spot welded as hereinbefore described, the spot welding making the several members rigid with each other in their positions as set in the machine so that when the frame is removed from the machine all of the several members and connecting parts of the bicycle frame occupy their proper relative positions, the frame being accurate as to alignment and a rigid unitary structure.

Thereafter the frame is completed by having the several joints properly brazed. It is to be noted that there is substantially no laborious hand work in the production of a frame by means of my invention. The several parts are taken as they come from the machines which produce them, that is, the presses and cut-off machine, and are loosely assembled together. The several parts, of course, fit tightly enough together so that the frame as a whole retains its shape. The frames one after another are placed in the machine, clamped as described and when clamped and held in clamped position with the several longitudinal members in compression and all of the joints tightly closed, all of the connections are made rigid by spot welding in their accurate positions as set in the machine.

By means of my invention I have eliminated all hard laborious labor in connection with the production of such frames. I have eliminated the necessity of employing skilled labor for adjusting the frame after being brazed for the reason that frames made in accordance with my invention and by means of my improved machine are substantially true and accurate after having been brazed. It is well understood, where it is necessary to bend or spring thin tubular members to align the machine, insipient fissures or cracks are formed in the outer surface of the tubular surface, this outer surface or skin being relatively hard and brittle. And it is now understood that these incipient cracks and fissures tend to increase in depth and extent due to the severe vibrations that the frame is subjected to in use. It is now understood that these incipient fissures and cracks are the cause of the frequent breakdowns in these frames. As it is not necessary to force the longitudinal tubular members of frames made in accordance with my invention out of their positions as set in the machine, I eliminate these incipient fissures and cracks and consequently frames made in accordance with my invention are more durable than those heretofore produced.

Another feature incident to my invention resides in the fact that if the tubular members are forced slightly to one side or the other when clamping the frame into the machine, the fact that the connecting portions are heated, due to the spot welding, relieves these members of all strain and eliminates any possibility of the parts being thrown or forced out of their true positions when the frame is taken from the machine or when it is brazed.

As many modifications of my invention will readily suggest themselves to one skilled in the art, I do not limit or confine my invention to the specific details of construction of my machine or to the specific steps or sequence of steps herein described.

I claim:

1. In a machine for use in making a tubular frame, the frame including two separated connections and a third connection, the third connection spaced from and connected to the separated connections by tubular members, means for rigidly holding the two separated connections, and means for pressing the third connection toward the other two, the pressing means being adapted to equalize the pressure on the two separated connections.

2. In a machine for use in making a tubular frame, the frame including two separated connections and a third connection, the third connection spaced from and connected to the separated connections by tubular members, means for rigidly holding the two separated connections, and means for pressing the third connection toward the other two, said pressing means including a pivoted pressure member for engaging the third connection and adapted to tilt to equalize the pressure on the two separated connections.

3. In a machine for use in making a tubular frame, the frame including two separated connections and a third connection spaced from and connected to the two separated connections by tubular members, the two separated connections being spaced apart and being connected by a tubular member, means for pressing one of said separated connections toward the other to place the connecting tubular member under compression and closing the joints at its ends, means for pressing the third connection toward the other two and adapted to equalize the pressure on the two separated connections, as and for the purpose specified.

4. In a machine for use in making a tubular frame the frame including two separated connections connected by a tubular member and a third connection which is cylindrical, the third connection spaced from the separated connections by tubular members, the ends of the tubular members which contact with the cylindrical connections being cut to fit accurately around same, doweling members projecting within the cylindrical connection and the tubular members connected therewith, the doweling members having flanged parts adapted to contact with the interior surface of the cylindrical connection, means for rigidly holding the two separated connections and means for pressing the cylindrical connection toward the two separated connections, said latter means being adapted to equalize the pressure on the two separated connections and means for pressing the flanges on said doweling members tightly against the inner surface of the cylindrical connection while the cylindrical connection is pressed toward the separated connections.

5. The herein described improvements for making tubular frames having forked parts such as the rear forked part of a bicycle frame, having upper and lower forks, the rear ends of the sides of the two forks being connected to a plate, the forward ends of the lower fork connected to a crank box, the forward end of the upper fork connected to a seat post bracket, means for holding the crank box and seat post bracket rigid and properly spaced, means for pressing the plates toward the crank box and seat post bracket to place all of the tubular fork sides under compression, means for setting and holding the fork sides transversely between their ends while under compression and means for forcing a strut between the two sides of each fork adjacent to the point at which the sides are held transversely, as and for the purpose specified.

6. The herein described improvements for making tubular frames having forked parts such as the rear forked part of a bicycle frame, having upper and lower forks, the rear ends of the sides of the two forks being connected to a plate, the forward ends of the lower fork connected to a crank box, the forward end of the upper fork connected to a seat post bracket, means for holding the crank box and seat post bracket rigid and properly spaced, means for pressing the plates toward the crank box and seat post bracket to place all of the tubular fork sides under compression, a spacing member provided with notches for receiving the two sides of a fork, the member mounted on a pivoted arm to swing in the plane of the frame to engage and disengage the member with the fork sides, as and for the purpose specified.

7. The herein described improvements for making tubular frames having forked parts such as the rear forked part of a bicycle frame, having upper and lower forks, the rear ends of the sides of the two forks being connected to a plate, the forward ends of the lower fork connected to a crank box, the forward end of the upper fork connected to a seat post bracket, means for holding the crank box and seat post bracket rigid and properly spaced, means for pressing the plates toward the crank box and seat post bracket to place all of the tubular fork sides under compression, a spacing member provided with notches for receiving the two sides of a fork, the member mounted on a pivoted arm to swing in the plane of the frame to engage and disengage the member with the fork sides, and a plunger member longitudinally movably mounted on the swinging lever for forcing a strut between the fork sides adjacent to the point at which they are transversely held.

8. The herein described improvements for making tubular frames having forked parts such as the rear forked part of a bicycle frame, having upper and lower forks, the rear ends of the sides of the two forks being connected to a plate, the forward ends of the lower fork connected to a crank box, the forward end of the upper fork connected to a seat post bracket, means for holding the crank box and seat post bracket rigid and properly spaced, means for pressing the plates toward the crank box and seat post bracket to place all of the tubular fork sides under compression, a spacing member provided with notches for receiving the two sides of a fork, the member mounted on a pivoted arm to swing in the plane of the frame to engage and disengage the member with the fork sides, and a longitudinally movable plunger mounted on said pivoted arm and adapted to force a strut between the fork sides adjacent to the point at which they are held, and a pivoted cam carried by the lever for forcing the plunger to set a strut between the forked sides.

9. The herein described improvements for making tubular frames having forked parts such as the rear forked part of a bicycle frame, having upper and lower forks, the rear ends of the sides of the two forks being connected to a plate, the forward ends of the lower fork connected to a crank box, the forward end of the upper fork connected to a seat post bracket, means for holding the crank box and seat post bracket rigid and properly spaced, means for pressing the plates toward the crank box and seat post bracket to place all of the tubular fork sides under compression, a plunger for setting a strut between the ends of the fork sides and a member for straddling the fork to resist spreading the fork sides when the strut is forced into place.

10. The herein described improvements for making tubular frames having forked parts such as the rear forked part of a bicycle frame, having upper and lower forks, the rear ends of the sides of the two forks being connected to a plate, the forward ends of the lower fork connected to a crank box, the forward end of the upper fork connected to a seat post bracket, means for holding the crank box and seat post bracket rigid and properly spaced, means for pressing the plates toward the crank box and seat post bracket to place all of the tubular fork sides under compression, a pivoted lever mounted for swinging in the plane of the frame, provided with a rigid spacing member having slots for receiving the fork sides at a point between their ends for setting the fork sides transversely, a plunger carried by the lever for forcing a strut between the fork sides adjacent to the point at which they are transversely held, the slotted member preventing the spreading of the fork sides when the strut is forced between them.

11. The herein described method of making tubular frames which consists in rigidly clamping the frame parts and placing the tubular members thereof under compression, and while the members are thus held, spot welding the several connections to make the frame rigid and while the frame is still clamped blowing air through the parts thereof to rapidly cool the several joints.

Signed at Shelby, Ohio, this 21st day of June, 1922.

AUGUST D. MEISELBACH.